Oct. 4, 1966        G. R. PEARCE ET AL        3,277,350
WET ELECTROLYTIC ENCAPSULATED CAPACITOR
Filed Nov. 16, 1962                          2 Sheets-Sheet 2

INVENTORS
RONALD A. BAKER
GODFREY ROY PEARCE
BY
ATTORNEY

United States Patent Office 3,277,350
Patented Oct. 4, 1966

3,277,350
WET ELECTROLYTIC ENCAPSULATED CAPACITOR
Godfrey Roy Pearce, Lawrence, and Ronald A. Baker, Indianapolis, Ind., assignors to P. R. Mallory & Co., Inc., Indianapolis, Ind., a corporation of Delaware
Filed Nov. 16, 1962, Ser. No. 238,194
12 Claims. (Cl. 317—230)

This invention relates generally to electrolytic apparatus and has specific application to such apparatus including means and methods for providing electrolytic capacitors sealed within a plastic case.

Prior experience in the capacitor art has clearly established the need for providing efficient protective sealing of capacitor units. Among the important considerations giving rise to this need are the following: resistance to moisture, resistance to chemical attack, resistance to vapors, resistance to heat distortion, mechanical rigidity, containment of the electrolyte, and preservation of electrical properties.

The continual advancement of plastics technology has brought forth the use of many such materials for encapsulation of capacitors. Furthermore, the development of new and improved molding techniques has afforded great flexibility in the methods by which encapsulation is accomplished. Invariably, however, each encapsulation process must incorporate one or more special features or steps which are necessary solely to circumvent undesirable properties of the encapsulating material, or to obviate deleterious effects on the capacitor body caused by the encapsulation process per se. For example, the high thermal coefficient of expansion of most plastics relative to metals has made difficult the retention of a good seal at the terminal wire bond. Hence, the use of two different encasing materials, in order to utilize a relatively low thermal coefficient of expansion in the plastic used for end-plugging about the terminal wires, is known to the art.

Physical disturbance of the capacitor body caused by elevated molding pressures and temperatures is another detrimental effect which has led to specific modifications of the encapsulation process. One solution therefor is known to the art wherein the intermediate step of a multi-stage sealing process consists of inserting a stopper plug to isolate each end of the capacitor body from the effects of the final injection of end seal plastic. Another problem very common to the art of molding capacitors is the susceptibility of a component in a single-stage molding operation to come forth with an uneven, often dangerously thin wall section in the casing. This result is due to the difficulty of accurately centering the capacitor body circumferentially in the mold by means of piloting on the terminal lead wires. A further difficulty is the need for special provisions for drying and impregnating the capacitor body immediately following encasement and just prior to final sealing.

An important characteristic of electrolytic capacitors which must be recognized in the design of encapsulated configurations is the formation of gases such as hydrogen, ammonia, and oxygen as a natural result of the electrolytic action. Means must be provided for the escape of such gases to avoid accumulation of dangerous internal pressures which may lead to explosive rupture of the capsule. For obvious reasons of safety, electrical underwriters require the provision of venting means for all electrolytic capacitors operating at certain specified voltages and above. Hence, the prior art on electrolytic capacitors contains myriad concepts for venting of gases. Because the vast majority of said concepts feature mechanical case vents or elastomeric or porous ceramic end plugs, their use in molded capacitor concepts is antithetical to the principle of economical, high-speed encapsulation with a single plastic material. Thermosetting resins have been widely used for encapsulation of electrostatic capacitors, but the inability of such materials to provide adequate self-venting has limited their use as a unitary housing for electrolytic capacitors. In contradistinction thereto, the present invention describes a molded construction wherein explosive rupture from gas formation is inherently avoided by means of thermal self venting, and wherein the gas permeability of the material itself is significant.

Ordinary thermoplastic compounds are not new to the art of molding electrical capacitors, but they are also possessed of certain undesirable physical properties which limit their application. Foremost among these disadvantages are the susceptibility to physical distortion from inadvertently applied local soldering heat, and the generally inferior mechanical rigidity compared to that of thermosetting compounds. Furthermore, peculiar chemical properties of many thermoplastics have made multistage molding processes of a single material difficult in the matter of obtaining a reliable fusion. Also, the high coefficient of thermal expansion presents the same terminal sealing problems associated with most thermosetting compounds. Finally, the flame-supporting properties of many thermoplastics are detrimental to safety.

A long-standing need has existed, therefore, for a means and method whereby an encapsulated capacitor assembly having superior physical, mechanical, and electrical properties can be economically produced with a high degree of reliability. The present invention has answered this need and has hereupon contributed an extraordinary advancement in the capacitor art.

It is, therefore, an object of the present invention to provide a novel and extremely economical encapsulated capacitor which overcomes each of the aforementioned problems inherent in the encapsulation art.

Another object of the present invention is to provide an encapsulated capacitor with a homogeneous casing having excellent mechanical rigidity, high resistance to heat distortion, outstanding low temperature physical characteristics, low thermal coefficient of expansion, extremely low moisture absorption, and a natural thermal self venting feature for release of internal gases.

Another object of the present invention is to disclose a novel molding technique which provides excellent fusion of a single molding material during a two-stage molding operation.

Yet another object of the present invention is to disclose the adaptability of this novel molding technique to the encasement of various sized capacitors in any desired resulting geometrical shape. For example, a miniature capacitor can be encapsulated in the shape of a rectangular parallelepiped as readily as a conventional cylindrical capacitor can be encased with resulting cylindrical geometry.

Still another object of the present invention is to guarantee a safe minimum wall thickness of the capacitor casing by means of a two-stage molding process wherein a preformed housing section is employed as the first-stage element.

Still another object of the present invention is to utilize an efficiently preimpregnated capacitor body, thereby avoiding the time-consuming and expensive impregnation and drying steps which traditionally take place immediately prior to final sealing.

Yet another object of the present invention is to encapsulate the capacitor body with a material which is initially inexpensive and which has a further economical advantage in that the molding scrap therefrom is fully reusable.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing and wherein like reference characters describe elements of similar function therein and wherein the scope of the invention is determined rather from the dependent claims.

For illustrative purposes, the invention will be described in connection with the accompanying drawing in which.

Generally speaking, the present invention provides the means and method for economically encapsulating a capacitor body within a thermoplastic casing through use of a two-stage molding process. The initial step of the two-stage process consists of molding a thermoplastic casing in a geometrical shape substantially equivalent to the contour of the preimpregnated capacitor body to be encased. Depending upon the particular geometry of the part to be encased, either one or two closure surfaces are intentionally omitted from the preformed casing, thereby permitting rapid insertion of the capacitor body within the casing in preparation for the final molding stage. Using the same thermoplastic material as that of the preformed casing, the second and final molding stage completes the encapsulation process by supplying the remaining closures, thereby producing a capacitor assembly with superior physical, mechanical, and electrical properties.

Two representative embodiments of the present invention will be described in detail herein as being illustrative of the special features to be ultimately claimed. One embodiment comprises the encapsulation of a conventional electrolytic capacitor having cylindrical geometry, shown in drawing FIGURES 1 through 5. A second embodiment comprises the encapsulation of a miniaturized electrolytic capacitor with the resulting case form of a rectangular parallelepiped, shown in drawing FIGURES 6 through 10.

Figure 1:
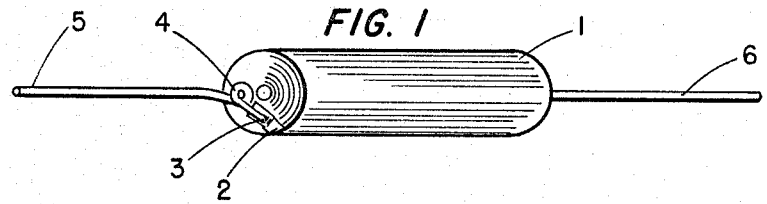
FIGURE 1 is a perspective view of a typical pre-impregnated, convolutely-wound capacitor body with terminal wires attached, capable of being provided with a plastic casing according to the present invention.

Referring now to the drawings, the convolutely-wound capacitor body 1 shown in FIGURE 1 is substantially cylindrical in shape, and is usually no more than a fraction of an inch in diameter and not more than two inches, sometimes considerably less than one inch, in length. The illustrative example herein shown contemplates an aluminum foil sheet interwound with an absorbent material such as paper, and employing a semi-viscous liquid electrolyte, such as a compounded mixture consisting principally of ethylene glycol and boric acid. If desired, solid electrolytes may be used. A metal capacitor tab 2 is provided at each end of the cylindrical body for attachment of terminal wires or elements 5 and 6. Terminal wires 5 and 6 are welded to the respective capacitor tabs, a typical weld 3 being illustrated in FIGURE 1. The spiral loop 4 which is preformed in terminal wire 5 is typical of both terminal wires and is a means for substantially increasing the pull-out strength of the wires when embedded in the final plastic casing. The wire loop can be formed in geometrical planes and shapes other than that shown in the drawing, but it is imperative that the convolutions never overlap into self contact. Otherwise, the critical low leakage path for containment of the liquid electrolyte will be dangerously impaired, as discovered by actual experimentation. Capacitor body 1 is preimpregnated by conventional methods to provide interim protection against moisture and handling effects, pending final encapsulation by the molding process.

Figure 2:
FIGURE 2 is a longitudinal sectional view of a preformed plastic cylindrical casing comprising the main portion of the capacitor housing.

FIGURE 2 shows the main encasement member 7 which is individually formed of thermoplastic material, for example, fiber-filled polypropylene, in a cylindrical shape with dimensions such that capacitor body 1 can be contained therein. Formation of casing 7 constitutes the first step in the two-stage molding process practiced by this invention. Since casing 7 is individually fabricated, the physical dimensions thereof can be controlled as necessary to insure adequate wall strength in the event that no addition of thermoplastic material occurs to the inside cylindrical wall during the final encapsulation operation.

Figure 3:
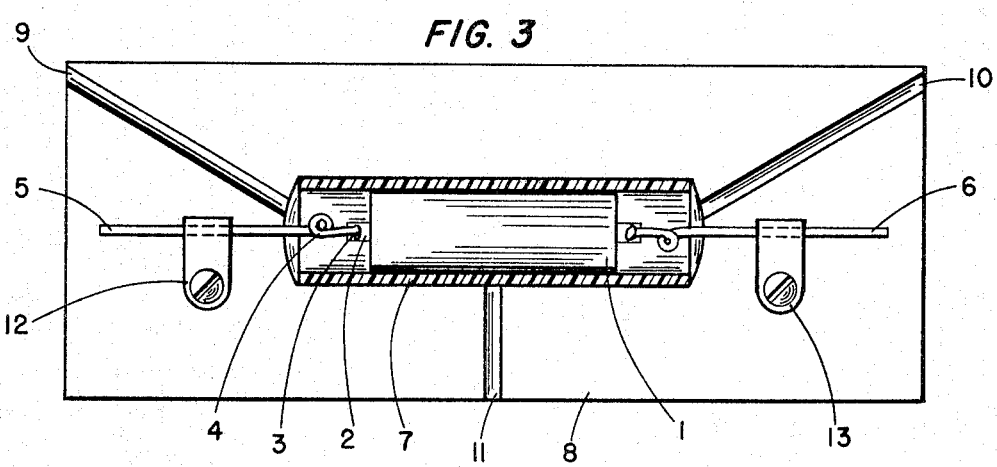
FIGURE 3 is a plan view of one mold half, showing the capacitor body inside the preformed casing, the casing being seen in a longitudinal sectional view prior to introduction of the end-molding plastic.

FIGURE 3 shows capacitor body 1 oriented inside preformed casing 7, both components resting within the cavity of mold form 8. The outside diameter of preformed casing 7 creates a line-to-line fit with the inside diameter of the mold cavity. Terminal wires 5 and 6 are positioned within a semi-circular cross-section recess in the mold form face surface, and are retained in correct relationship during molding by means of screw clamps 12 and 13. It is to be emphasized that screw clamps 12 and 13 are merely illustrative in configuration. For high production rates, the equivalent of a spring-loaded clip would be employed.

The final step in accomplishing complete encapsulation of capacitor body 1 is to introduce the same thermoplastic material comprising pre-formed casing 7 into the mold cavity through mold gates 9 and 10, such material being introduced in a precise molten condition (290° C. for fiber-filled polypropylene) so as to effect complete coalescence with the preformed casing 7. Purging of all air being displaced by the incoming molten mass is effected through the vent passage 11 which is recessed into the mold face surface.

Figure 4:
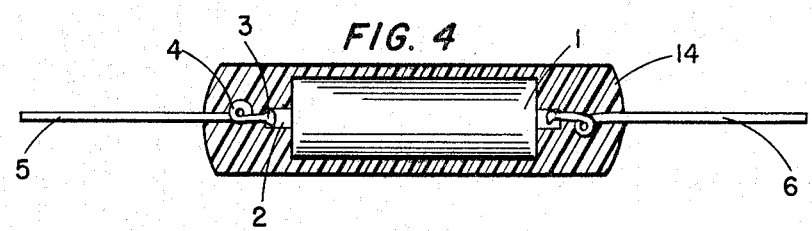
FIGURE 4 is a longitudinal sectional view of the final homogeneous casing with the capacitor body housed therein, after removal from the mold.

In FIGURE 4 is illustrated the unity and totality of the finished molded casing 14. The second stage molding operation was successful in surrounding the capacitor body, completing the end closures, and creating perfect fusion with the pre-formed casing, producing a homogeneous housing of thermoplastic material having superior protective properties.

Figure 5:
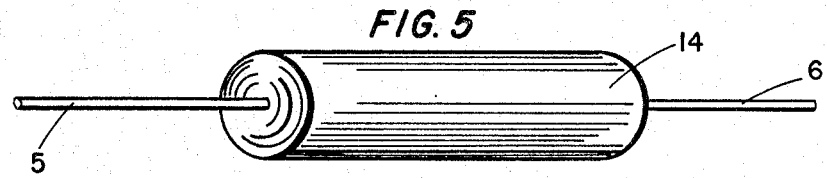
FIGURE 5 is a perspective view of the fully encapsulated capacitor assembly after removal from the mold.

The perspective view of FIGURE 5 reveals the smooth, compact, and functional appearance of the final encapsulated product 14, with only the terminal wires 5 and 6 projecting therefrom. It has been found that no special plugging provisions are necessary for insuring tightness of the end seal around the terminal wire because the end closure material effects a secure bond thereto.

Figure 6:
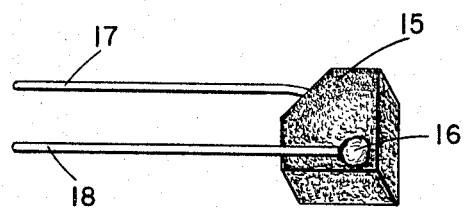
FIGURE 6 is a perspective view of a typical miniaturized solid tantalum capacitor body with terminal wires attached, capable of being provided with a plastic casing according to the present invention.

Refer to FIGURE 6 through 10 for illustration of a second embodiment of the present invention. This encapsulation contemplates the enclosure of a miniaturized capacitor within a molded casing taking the shape of a rectangular parallelepiped. In FIGURE 6 is shown a typical miniaturized sintered-anode tantalum capacitor body 15 which is deemed representative of the shape of numerous type capacitors in this solid electrolyte series. It will be seen that the precise geometry of such miniaturized units can vary widely without changing the subsequent means and method for encapsulation thereof. The particular capacitor body 15 used for this illustration occupies less volume than a cube with one-eighth inch sides. Terminal wire 18 is soldered to cathode surface 16 by conventional means. Terminal wire 17 is joined to the buried anode in likewise conventional manner.

Figure 7:
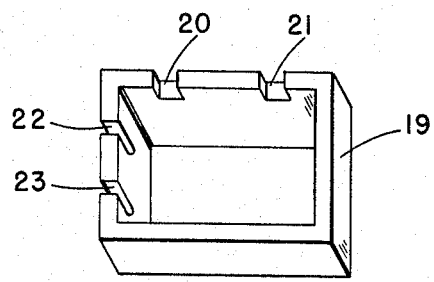
FIGURE 7 is a perspective view of a preformed plastic five-sided container comprising the main portion of the capacitor casing.

FIGURE 7 shows the main encasement member 19 which is individually molded of thermoplastic material, for example, fiber-filled polypropylene, in the shape of a five-sided container, constituting the first of two molding stages practiced by this invention. One side of preformed casing 19 has recesses 20 and 21 through which the second-stage mold material is flowed during final encasement. Recesses 22 and 23 are provided for location of terminal wires 17 and 18.

Figure 8:
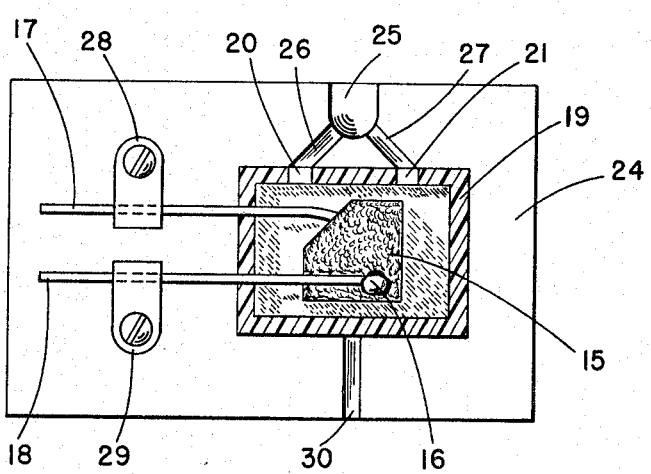
FIGURE 8 is a plan view of one mold half, showing the capacitor body inside the preformed container, the container being shown in a longitudinal sectional view prior to introduction of the molding plastic.

FIGURE 8 shows capacitor body 15 oriented within preformed casing 19, both components resting inside the cavity of mold form 24. The outside dimensions of the pre-formed casing 19 create a line-to-line fit with the inside dimensions of the mold cavity. Terminal wires 17 and 18 are positioned within a semicircular cross-section recess in the mold form face surface, and are retained in correct relationship during molding by means of screw clamps 28 and 29.

The final step in accomplishing complete encapsulation of capacitor body 15 is to introduce the same thermoplastic material comprising pre-formed casing 19 into the mold cavity through header 25, mold gates 26 and 27, and recesses 20 and 21, respectively. Said material is introduced in a precise molten condition (290° C. for fiber-filled polypropylene) to effect complete coalescence with the pre-formed casing 19. Purging of all air being displaced by the incoming molten mass of plastic is effected through vent passage 30, said passage being recessed in the surface of the mold face.

Figure 9:
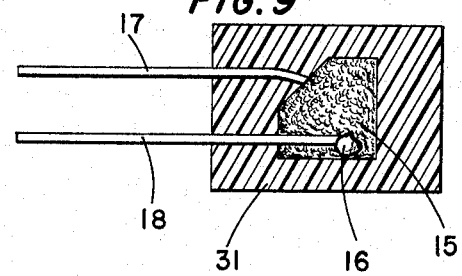
FIGURE 9 is a longitudinal sectional view of the final homogeneous casing with the capacitor body housed therein, after removal from the mold.

In FIGURE 9 is illustrated the unity and totality of the finished molded casing 31. The second stage molding operation was successful in surrounding the capacitor body, completing the top and side closures, and creating a perfect fusion with the pre-formed casing, thereby producing a homogeneous housing of thermoplastic material having superior protective properties.

Figure 10:
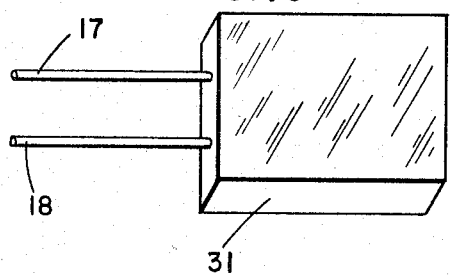
FIGURE 10 is a perspective view of the fully encapsulated capacitor assembly after removal from the mold.

The perspective view of FIGURE 10 reveals the rectangular parallelepiped geometry of the final encapsulated product 31 which, in this specific example, measures only seven-sixteenth inch by five-sixteenth inch by three-sixteenth inch, with merely the terminal wires 17 and 18 projecting therefrom.

Successful encapsulation by the molding process of the present invention has been consistently repeated with two different thermoplastic materials, viz, polypropylene and polyethylene, of which the former is the preferred material. It was determined, however, in the course of experimentation, that the many desirable properties necessary for the ultimate efficiency in encapsulation could not be found in ordinary polypropylene or polyethylene compositions. For example, the linear coefficient of thermal expansion of a typical general purpose polypropylene composition is $12.1 \times 10^{-5}$ in./in./° C. When compared to a coefficient of $1.8 \times 10^{-5}$ in./in./° C. for ordinary copper terminal wire, it can readily be seen that a special end seal would be required to contain the capacitor electrolyte and provide environmental protection at elevated temperatures, because the thermoplastic casing would separate from the terminal wire as a result of differential expansion. Furthermore, ordinary polypropylene did not produce the quality of fusion necessary for efficient encapsulation when applied to the present two-stage process. Heat distortion and hardness characteristics were found to be marginal.

Optimum encapsulation by the molding process of the present invention, therefore, was obtained through use of polypropylene and polyethylene compounds containing a fibrous filler material of specific size and quantity. A typical filler material which produced ideal results herein was asbestos. A remarkable reduction in linear coefficient of thermal expansion was experienced with fiber-filled polypropylene, the new coefficient becoming $3.8 \times 10^{-5}$ in./in./° C., compared to the aforementioned coefficient of $12.1 \times 10^{-5}$ in./in./° C. for general purpose polypropylene. Ideal molding characteristics were also obtained, and physical properties of hardness, heat distortion, and melting point became quite superior. Fiber-filled polyethylene was found to possess similarly attractive characteristics.

Through the present invention, therefore, is disclosed the means and method for producing an efficient, economical, and reliable molded capacitor, encapsulated with fiber-filled polypropylene or fiber-filled polyethylene, having the following specific advantages: desirably low differential expansion between the encasement material and the terminal wires; high heat distortion level so as to resist soldering heat; superior molding characteristics which provide complete coalescence between the molten mass being introduced and the pre-formed casing, both of like material; extremely low moisture absorption; high impact strength and rigidity; thermal self venting and gas permeability; retention of good physical properties at temperatures as low as −55° C.; reusability of all molding scrap; and the flame-resisting or slow burning properties of the material.

The two-stage molding process of the present invention offers one very distinct advantage, viz, the assurance that the wall thickness of the finished capsule can never be less than the wall thickness of the preformed casing, regardless of how badly misaligned the capacitor body becomes during processing. A collateral advantage of this process is the option of using any desired coloring in the respective second-stage molding gate hoppers to identify polarity on cylindrical capacitors where the terminals are on opposite ends. Furthermore, the total encapsulation of the terminal connection with a mass of plastic, as this invention teaches, prevents inadvertent contact between the electrolyte and the connector parts, thus avoiding corrosive effects thereupon.

In order to demonstrate the ability of the present encapsulated electrolytic capacitor to absolutely avoid explosive vase rupture during severe overload conditions, the following test was conducted on a typical cylindrical unit. A high voltage from an alternating source was impressed upon the capacitor terminals, causing an unrealistically high evolution of gases within the capacitor casing. As the internal pressure increased, so did the temperature increase until a point was reached wherein the thermoplastic casing material distorted locally on its periphery, accompanied by formation of a small gas discharge hole, and the almost imperceptible release of internal pressure thereafter. This self-venting action was observed as being nonexplosive and nonshattering, and the terminal regions were undisturbed. At lower, more realistic levels of applied voltage, the gas permeability characteristic of the thermoplastic casing material, itself, aids in releasing internally formed gases, such permeability being known to increase with increasing temperature. A further feature of this capacitor design which aids the release of gases is the slight elastomeric effect of the case material which can occur about the terminal wires due to high internal pressure, without significant escape of electrolyte.

One of the most difficult problems to be surmounted in perfecting the present molding method was the design of the molding equipment per se. It was clear that the achievement of an adequate seal with complete fusion in a two-stage process, such as used herein, would ideally be accomplished with a single mold material. It was critical, therefore, that the molding machine and mold gates be capable of providing an adequate quantity of molten material at the correct temperature to obtain this sealed junction. Only through exhaustive experimentation could the precisely correct molding configuration be established. Thereupon, it was discovered that the point of fusion of the plastic occurred at a location quite close to the mold gate outlet where a higher plastic temperature existed, said point being signified generally by recesses 20 and 21 shown in FIGURE 8 of the drawings. This phenomenon contributed materially to the achievement of a much improved encapsulation.

Harmful physical distortion of the capacitor body during the molding process has not been experienced with the present invention. One mitigating effect on the molding cylinder pressure level is the orifice action of the relatively small diameter mold gate passages 9 and 10 of FIGURE 3, and 26 and 27 of FIGURE 8, which action becomes significant at the high flow rates employed herein. The approximate area of gate passages 9 and 10 is 0.003 square inch each. Corresponding fluid pressure, as measured at the plasticizer cylinder, should be 1000 to 2000 pounds per square inch. Proper injection temperature for fiber-filled polypropylene is 290° C., and for fiber-filled polyethylene is 230° C. Nominal operating temperature limits of the described capacitor are conservatively designated as −30° C. to +85° C.

The encapsulated capacitor of the present invention as hereinabove described in two of its representative embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

What is claimed is:

1. A method of encapsulating a wet electrolytic capacitor body comprising the steps of preforming a plastic casing having open ends and having contours substantially equivalent to the contours of said wet capacitor body, orienting said capacitor body within said casing with said capacitor body intermediate the ends of said casing so that only the leads of said capacitor body project from said casing, positioning said casing containing said capacitor body in a mold cavity, and introducing molten plastic material having fusion characteristics substantially equivalent to those of said preform casing into said casing in said mold cavity so as to fill all voids within said casing, said material coalescing with said preform casing thereby producing a unitary capacitor capsule completely covering said capacitor body and adhering to said terminal leads to form a tight seal therewith.

2. A method of encapsulating a wet cylindrical shaped electrolytic capacitor body comprising the steps of preforming a plastic tubular casing having an inner radial dimension substantially equal to the radial dimension of said capacitor body and a longitudinal dimension longer than that of said capacitor body orienting said capacitor body within said tubular casing with said capacitor body intermediate the ends of said casing so that only the leads of said capacitor body project from said casing, positioning said casing containing said capacitor body in a mold cavity, and introducing molten plastic material having fusion characteristics substantially equivalent to those of said preform casing into said casing in said mold cavity so as to fill all voids within said casing, said material coalescing with said preform casing thereby producing a unitary capacitor capsule completely covering said capacitor body and adhering to said terminal leads to form a tight seal therewith.

3. A method of encapsulating a wet cylindrical shaped electrolytic capacitor body comprising the steps of preforming a plastic tubular casing having an inner radial dimension substantially equal to the radial dimension of said capacitor body and a longitudinal dimension longer than that of said capacitor body, orienting said capacitor body within said tubular casing with said capacitor body intermediate the ends of said casing so that only the leads of said capacitor body project from said casing, positioning said casing containing said capacitor body in a mold cavity, and injecting molten plastic material having fusion characteristics substantially equivalent to those of said preform casing into said casing in said mold cavity so as to fill all voids within said casing, said material coalescing with said preform casing thereby producing a unitary capacitor capsule completely covering said capacitor body and adhering to said terminal leads to form a tight seal therewith and wherein the internal gases generated by said capacitor operation are allowed to dissipate.

4. A method of encapsulating a wet cylindrical shaped electrolytic capacitor body comprising the steps of preforming a fiber-filled polypropylene tubular casing having an inner radial dimension substantially equal to the radial dimension of said capacitor body and a longitudinal dimension longer than that of said capacitor body, orienting said capacitor body within said tubular casing with said capacitor body intermediate the ends of said casing so that only the leads of said capacitor body project from said casing, positioning said casing containing said capacitor body in a mold cavity, and injecting molten fiber-filled polypropylene material into said casing in said mold cavity so as to fill all voids wtihin said casing, said material coalescing with said preform casing thereby producing a unitary capacitor capsule completely covering said capacitor body and adhering to said terminal leads to form a tight seal therewith and wherein the internal gases generated by said capacitor operation are allowed to dissipate.

5. A method of encapsulating a wet cylindrical shaped electrolytic capacitor body comprising the steps of preforming a fiber-filled polypropylene tubular casing having an inner radial dimension substantially equal to the radial dimension of said capacitor body and a longitudinal dimension longer than that of said capacitor body, orienting said capacitor body within said tubular casing with said capacitor body intermediate the ends of said casing so that only the leads of said capacitor body project from said casing, positioning said casing containing said capacitor body in a mold cavity, and injecting molten fiber-filled polypropylene material having a molten temperature of about 290° centigrade into said casing in said mold cavity so as to fill all voids within said casing, said material coalescing with said preform casing thereby producing a unitary capacitor capsule completely covering said capacitor body and adhering to said terminal leads to form a tight seal therewith and wherein the internal gases generated by said capacitor operation are allowed to dissipate.

6. A method of encapsulating a wet cylindrical shaped electrolytic capacitor body comprising the steps of preforming a fiber-filled polyethylene tubular casing having an inner radial dimension substantially equal to the radial dimension of said capacitor body and a longitudinal dimension longer than that of said capacitor body, orienting said capacitor body within said tubular casing with said capacitor body intermediate the ends of said casing so that only the leads of said capacitor body project from said casing, positioning said casing containing said capacitor body in a mold cavity, and injecting molten fiber-filled polyethylene material into said casing in said mold cavity so as to fill all voids within said casing, said material coalescing with said preform casing thereby producing a unitary capacitor capsule completely covering said capacitor body and adhering to said terminal leads to form a tight seal therewith and wherein the internal gases generated by said capacitor operation are allowed to dissipate.

7. A method of encapsulating a wet solid electrolytic capacitor body comprising the steps of preforming an open-top five-sided casing of fiber-filled polypropylene material having inner contours larger than the contours of said solid electrolytic capacitor body, orienting said capacitor body within said casing with said capacitor body intermediate the sides of said casing so that only the leads of said capacitor body project from said casing, positioning said casing containing said capacitor body in a mold cavity, and injecting molten fiber-filled polypropylene material having a molten temperature of about 290° centigrade into said casing in said mold cavity so as to fill all voids within said casing, said material coalescing with said preform casing thereby producing a rectangular parallelepiped capacitor capsule completely covering said capacitor body and adhering to said terminal leads to form a tight seal therewith.

8. A housing for a wet electrolytic capacitor body comprising a casing of fiber-filled thermoplastic material having at least one open end and substantially equivalent in shape to the contours of said capacitor body, said capacitor body intermediate the ends of said casing, terminal leads of said capacitor body projecting from said casing, and an injected mass of fiber-filled thermoplastic forming closure means seated in said open end of said casing and filling voids in said casing, said closure means having fusion characteristics equivalent to those of said casing, said closure means coalescing with said casing and adhering to said projecting terminal leads thereby completely encapsulating said capacitor body, said fiber-filled thermoplastic closure means having substantially the same thermal coefficient of expansion as said terminal leads and allowing gases generated by said capacitor body to be dissipated.

9. A housing for a wet electrolytic capacitor body comprising a tubular casing of fiber-filled polypropylene material having an inner radial dimension substantially equal to the radial dimension of said capacitor body and a longitudinal dimension longer than that of said capacitor body, said capacitor body intermediate the ends of said casing, terminal leads of said capacitor body projecting from said casing, and an injected mass of fiber-filled polypropylene forming closure means seated in the open ends of said casing and filling voids in said casing, said closure means coalescing with said casing and adhering to said projecting terminal leads thereby completely encapsulating said capacitor body, said fiber-filled polypropylene closure means having substantially the same thermal coefficient of expansion as said terminal leads and allowing gases generated by said capacitor body to be dissipated.

10. A housing for a wet electrolytic capacitor body comprising a tubular casing of fiber-filled polyethylene material having an inner radial dimension substantially equal to the radial dimension of said capacitor body and a longitudinal dimension longer than that of said capacitor body, said capacitor body intermediate the ends of said casing, terminal leads of said capacitor body projecting from said casing, and an injected mass of fiber-filled polyethylene forming closure means seated in the open ends of said casing and filling voids in said casing, said closure means coalescing with said casing and adhering to said projecting terminal leads thereby completely encapsulating said capacitor body, said fiber-filled polyethylene closure means having substantially the same thermal coefficient of expansion as said terminal leads and allowing gases generated by said capacitor body to be dissipated.

11. A housing for a wet electrolytic capacitor body comprising an open-top five-sided preform casing of fiber-filled polypropylene having inner dimensions larger than the dimensions of said capacitor body, said capacitor body intermediate the sides of said casing, terminal leads of said capacitor body projecting from said casing, and an injected mass of fiber-filled polypropylene forming closure means seated in the open ends of said casing and filling voids in said casing, said closure means coalescing with said casing and adhering to said projecting terminal leads thereby completely encapsulating said capacitor body in the shape of a rectangular parallelepiped, said fiber-filled polyproylene having substantially the same thermal coefficient of expansion as said terminal leads and allowing gases generated by said capacitor to be dissipated.

12. A housing for a wet electrolytic capacitor body as claimed in claim 11, wherein said fiber-filled polypropylene contains asbestos fibers.

References Cited by the Examiner

UNITED STATES PATENTS

| 2,049,553 | 8/1936 | Weaver | 317—230 |
| 2,057,314 | 10/1936 | Robinson | 317—230 |
| 2,970,182 | 1/1961 | Miquelis | 317—230 |
| 3,058,040 | 10/1962 | Willington | 317—230 |
| 3,221,089 | 11/1965 | Cotton | 264—272 |
| 3,226,463 | 12/1965 | Wallace | 264—272 |

JOHN W. HUCKERT, *Primary Examiner.*

J. D. KALLAM, *Assistant Examiner.*